US011902952B2

(12) United States Patent
Sung

(10) Patent No.: US 11,902,952 B2
(45) Date of Patent: Feb. 13, 2024

(54) CARRIER AGGREGATION GROUPING BASED ON USER LOCATION IN 5G NR MASSIVE MIMO BEAMFORMING NETWORK

(71) Applicant: T-MOBILE INNOVATIONS LLC, Overland Park, KS (US)

(72) Inventor: Sanghoon Sung, Ashburn, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/551,717

(22) Filed: Dec. 15, 2021

(65) Prior Publication Data

US 2023/0189227 A1    Jun. 15, 2023

(51) Int. Cl.
*H04W 72/04* (2023.01)
*H04B 7/0452* (2017.01)
*H04B 7/06* (2006.01)
*H04W 24/10* (2009.01)
*H04W 64/00* (2009.01)
*H04W 72/0453* (2023.01)
*H04W 72/51* (2023.01)

(52) U.S. Cl.
CPC ...... *H04W 72/0453* (2013.01); *H04B 7/0452* (2013.01); *H04B 7/0626* (2013.01); *H04W 24/10* (2013.01); *H04W 64/00* (2013.01); *H04W 72/51* (2023.01)

(58) Field of Classification Search
CPC . H04W 72/0453; H04W 72/51; H04W 24/10; H04W 64/00; H04B 7/0452; H04B 7/0626
See application file for complete search history.

(56) References Cited

U.S. PATENT DOCUMENTS

| 2011/0212693 | A1* | 9/2011 | Sagfors | H04W 24/08 455/67.11 |
| 2015/0223125 | A1* | 8/2015 | Lu | G01S 5/00 455/440 |
| 2017/0366311 | A1* | 12/2017 | Iyer | H04L 5/0007 |
| 2018/0014290 | A1* | 1/2018 | Yi | H04W 72/044 |
| 2019/0288766 | A1* | 9/2019 | Ng | H04B 7/0404 |
| 2020/0008076 | A1* | 1/2020 | Peng | H04L 5/0055 |
| 2020/0053661 | A1* | 2/2020 | Yang | H04W 72/046 |

(Continued)

*Primary Examiner* — Aristocratis Fotakis
(74) *Attorney, Agent, or Firm* — Shook, Hardy & Bacon L.L.P.

(57) ABSTRACT

Methods, media, and systems are provided for carrier aggregation grouping based on user device location. For example, the methods, media, and systems receive one or more Synchronization Signal Block (SSB) beam reports from one or more user devices. Further, a base station divides a coverage area associated with a multiple-input multiple-output (MIMO) service into carrier aggregation (CA) groups associated with one or more component carriers. Upon receiving or determining the location of the one or more user devices associated with each of the one or more SSB beam reports, the one or more component carriers are assigned to at least one of the CA groups based on the location of the one or more user devices and the SSB beam reports. Furthermore, if interference from a neighboring base station is detected, the one or more component carriers experiencing the interference is grouped differently from the interfering carriers.

20 Claims, 5 Drawing Sheets

(56) References Cited

U.S. PATENT DOCUMENTS

| | | | |
|---|---|---|---|
| 2020/0074988 A1* | 3/2020 | Park ........................ | G01S 11/14 |
| 2021/0328642 A1* | 10/2021 | Dalsgaard ............ | H04B 7/1555 |
| 2022/0053519 A1* | 2/2022 | Akkarakaran .... | H04W 72/1263 |
| 2022/0077988 A1* | 3/2022 | Duan ...................... | H04L 5/005 |
| 2022/0116801 A1* | 4/2022 | Dallal .................. | H04B 7/0697 |
| 2022/0123824 A1* | 4/2022 | Lee ...................... | H04B 17/309 |
| 2022/0286175 A1* | 9/2022 | Matsumura .......... | H04B 7/0695 |
| 2022/0399931 A1* | 12/2022 | Karakkad Kesavan Namboodiri ........ | H04W 56/001 |
| 2023/0198729 A1* | 6/2023 | Haustein ............... | H04L 5/0053 370/329 |
| 2023/0254832 A1* | 8/2023 | Sen .................. | H04W 72/0453 370/329 |
| 2023/0284194 A1* | 9/2023 | Wang ................... | H04W 24/08 370/329 |

* cited by examiner

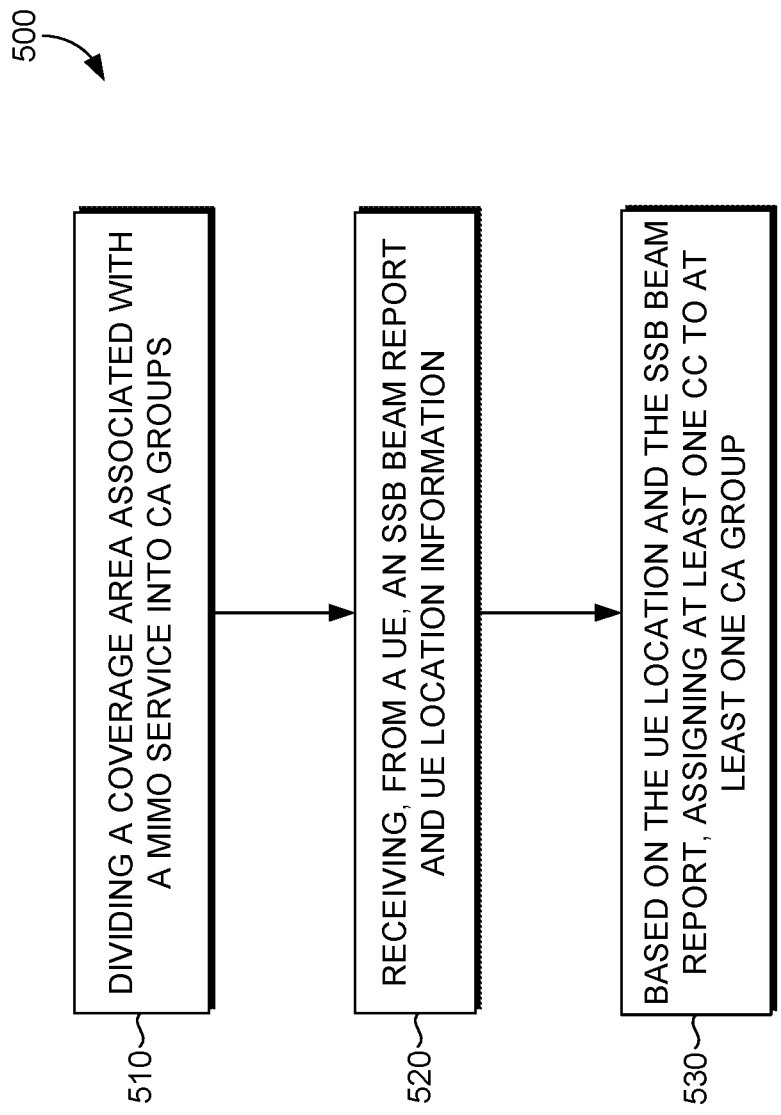

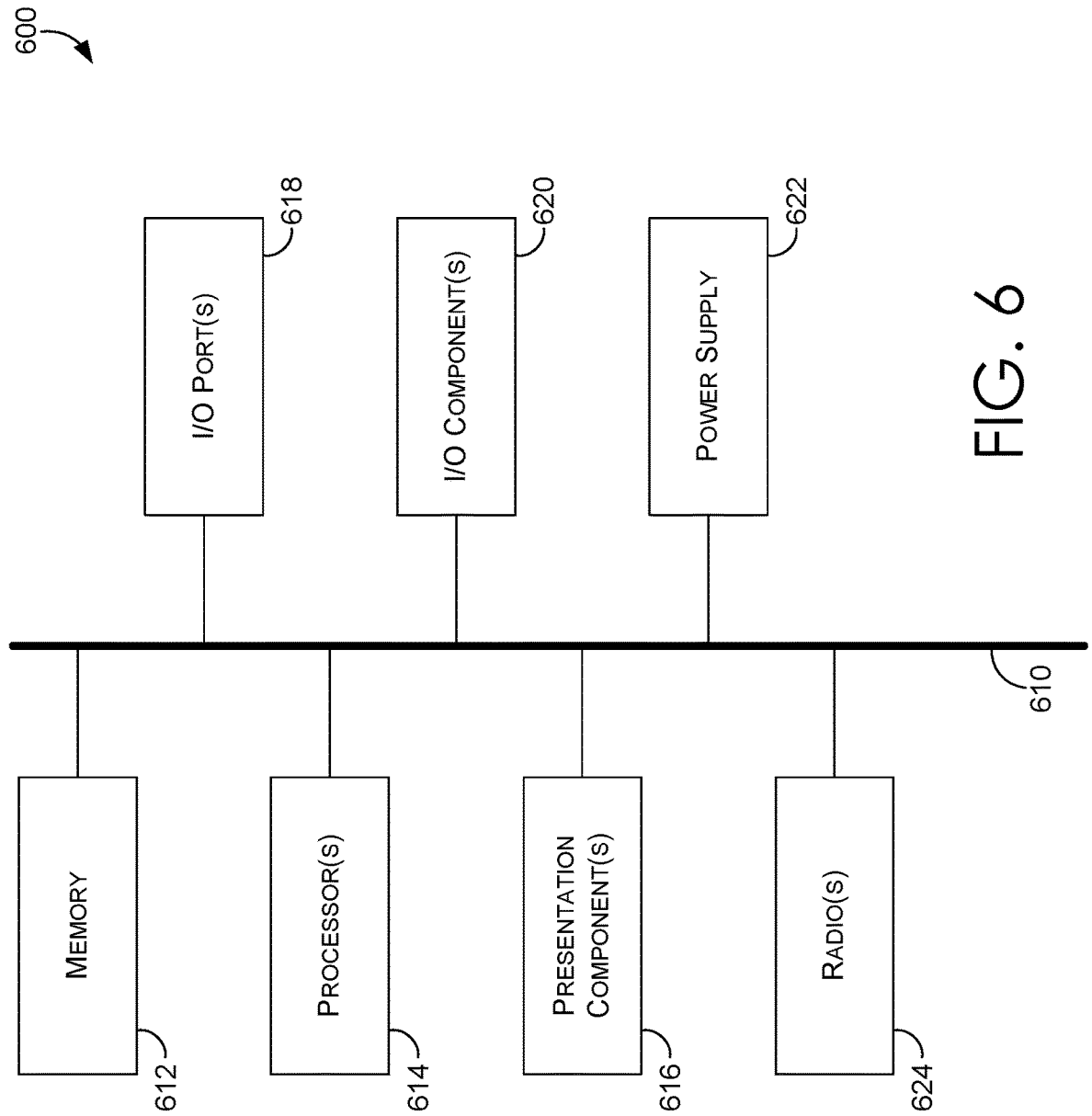

CARRIER AGGREGATION GROUPING BASED ON USER LOCATION IN 5G NR MASSIVE MIMO BEAMFORMING NETWORK

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to systems and methods for carrier aggregation grouping based on user device location, substantially as shown in and/or described in connection with at least one of the figures, and as set forth more completely in the claims.

In aspects set forth herein, and at a high level, the systems and methods divide a coverage area associated with a multiple-input multiple-output (MIMO) service into carrier aggregation (CA) groups associated with one or more component carriers. Additionally, one or more Synchronization Signal Block (SSB) beam reports are received from one or more user devices within a serviceable area of the coverage area. Further, a location associated with at least one of the one or more user device is received or determined. Upon receiving or determining the location, the one or more component carriers are assigned to at least one of the CA groups based on the location of the one or more user devices and the SSB beam reports. Furthermore, if interference from a neighboring base station is detected, the one or more component carriers experiencing the interference is assigned to a CA group that is different than the CA grouping of the interfering carrier of the neighboring base station.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIG. 5 depicts a flow diagram of an example method for CA grouping based on user device location, in accordance with aspects herein; and FIG. 6 depicts an exemplary computing environment suitable for use in implementations of the present disclosure, in accordance with aspects herein.

DETAILED DESCRIPTION

Figure 1:
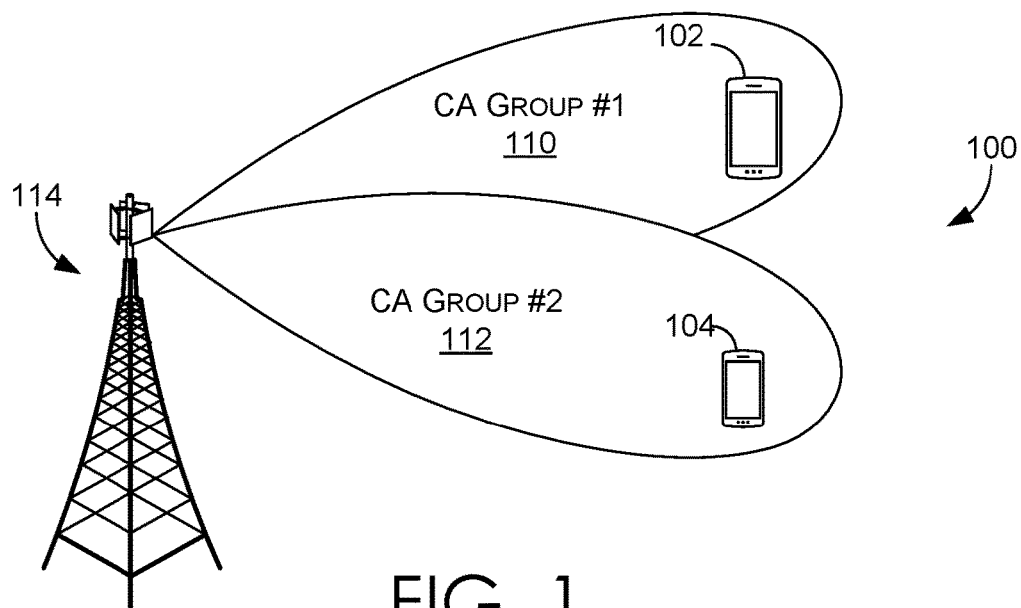
FIG. 1 depicts a diagram of an example carrier aggregation (CA) grouping environment for use in implementations of the present disclosure, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3 G | Third-Generation Wireless Technology |
| 4 G | Fourth-Generation Cellular Communication System |
| 5 G | Fifth-Generation Cellular Communication System |
| AOA | Angle of Arrival |
| CA | Carrier Aggregation |
| CD-ROM | Compact Disk Read Only Memory |
| CDMA | Code Division Multiple Access |
| CSI | Channel State Information |
| eNB | Evolved Node B |
| FDD | Frequency Division Duplex |
| gNB | Next Generation Node B |
| GPRS | General Packet Radio Service |
| GSM | Global System for Mobile communications |
| DVD | Digital Versatile Discs |
| EEPROM | Electrically Erasable Programmable Read Only Memory |
| IoT | Internet of Things |
| LTE | Long Term Evolution |
| MIMO | Multiple Input Multiple Output |
| NR | New Radio |
| OFDM | Orthogonal Frequency-Division Multiplexing |
| OTDOA | Observed Time Difference of Arrival |
| PC | Personal Computer |
| PDA | Personal Digital Assistant |
| PDCCH | Physical Downlink Control Channel |
| PDSCH | Physical Downlink Shared Channel |
| RAM | Random Access Memory |
| RF | Radio-Frequency |
| ROM | Read Only Memory |
| RSRP | Reference Transmission Receive Power |
| RSRQ | Reference Transmission Receive Quality |
| RSSI | Received Signal Strength Indicator |
| RTT | Round Trip Time |
| SINR | Signal-to-Interference and Noise Ratio |
| SS | Synchronization Signal |
| SSB | Synchronization Signal Block |
| TDD | Time Division Duplex |
| TDMA | Time Division Multiple Access |
| TOA | Time of Arrival |
| UL | Uplink |

In addition, words such as "a" and "an," unless otherwise indicated to the contrary, may also include the plural as well as the singular. Thus, for example, the constraint of "a feature" is satisfied where one or more features are present.

Furthermore, the term "or" includes the conjunctive, the disjunctive, and both (a or b thus includes either a or b, as well as a and b).

Additionally, a "mobile device," as used herein, is a device that has the capability of using a wireless communications network, and may also be referred to as a "computing device," "user device," "wireless communication device," or "UE." A mobile device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A UE may be, in an embodiment, similar to user devices 102 and 104, described herein with respect to FIG. 1. A UE may also be, in another embodiment, similar to user device 600, described herein with respect to FIG. 6.

Further, the term "coverage area," as used herein, refers to a geographical area wherein a network provides wireless communication services (e.g., the transfer of information without the use of an electrical conductor as the transferring medium). Wireless communication services may include, but are not limited to, the transfer of information via radio waves (e.g., Bluetooth®), satellite communication, infrared communication, microwave communication, Wi-Fi, and mobile communication. Embodiments of the present technology may be used with different wireless telecommunication technologies or standards, including, but not limited to, CDMA 1×Advanced, GPRS, Ev-DO, TDMA, GSM, WiMax technology, LTE, and/or LTE Advanced, among other technologies and standards.

In some aspects, UEs can optionally utilize the network to communicate with other computing devices (e.g., a mobile device(s), a server(s), a personal computer(s), etc.) through a "cell site" or "base station" using any one of a plurality of wireless communication protocols, such as 3G, 4G/LTE, 5G and other related protocols. In aspects, the network may be a telecommunications network(s), or a portion thereof. A telecommunications network might include an array of devices or components (e.g., one or more base stations). Components such as terminals, links, and nodes (as well as other components) can provide connectivity in various implementations. The network can include multiple networks, as well as being a network of networks.

In some aspects, the network can be part of a telecommunications network that connects subscribers to their immediate service provider. In some instances, the network can be associated with a telecommunications provider that provides services (e.g., 5G and LTE) to various types of UEs. For example, the network may provide voice, SMS, and/or data services to user devices or corresponding users that are registered or subscribed to utilize the services provided by a telecommunications provider. The network can comprise any communication network providing voice, SMS, and/or data service(s), such as, for example, a 1×circuit voice, a 3G network (e.g., CDMA, CDMA2000, WCDMA, GSM, UMTS), a 4G network (WiMAX, LTE, HSDPA), or a 5G network.

In some aspects, the coverage area includes one or more cells or sectors in which a base station may serve UEs, for example. Additionally, a coverage area may operate on one or more carriers, wherein a carrier defines a downlink frequency range for carrying communications from the base station to the UEs as well as a respective uplink frequency range for carrying communications from the UEs to the base station. A downlink and an uplink frequency range may be divided into sub-channels for carrying communications (e.g., one or more control channels for carrying control signaling and one or more traffic channels for carrying traffic data). In some aspects, the coverage area includes a plurality of component carriers, wherein a component carrier is a plurality of carriers from either contiguous frequency bands or non-contiguous frequency bands. In aspects, the component carrier on which a UE initially connects with is the primary component carrier and the other component carrier(s) on which the UE is served is the secondary component carrier associated with carrier aggregation.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, 5G standards involve higher data transfer speeds and more connections than previous generation communication systems. According to the Next Generation Mobile Networks Alliance, 5G is designed to provide data transfer rates of multiple tens of megabits per second to multiple tens of thousands of user devices. A goal for 5G communication systems is to enhance spectral efficiency and to reduce latency compared to standards for previous generation communication systems. Another goal includes reducing propagation loss resulting from operations at high and extremely high frequency bands (e.g., millimeter wave frequency bands). In aspects, 5G NR may use scalable OFDM air-interface, advanced channel coding, massive MIMO, beamforming, and other features to support higher data rates and applications (e.g., massive IoT and enhanced mobile broadband).

Conventional methods for carrier aggregation support downlink or uplink component carriers of different frequency bands or the same frequency bands for an individual UE. Secondary cell configuration associated with carrier aggregation in conventional methods for a UE occurs during a radio resource control connection establishment. Further, the secondary cell activation or deactivation is based on a buffer status. For example, the activation occurs upon the data buffer size for a UE exceeding a threshold. As another example, the deactivation of the secondary cell occurs upon the data buffer size for the UE dropping below the threshold. Upon deactivation, only the primary cell is being used for communications between the base station and the UE, for example. These conventional systems, for example, fail to consider activation and deactivation of primary and secondary cells based on factors other than the data buffer size. Failure to consider other factors for activation and deactivation result in reduced coverage balancing, increased interferences from various carriers or component carriers associated with the corresponding base station or a neighboring base station, reduced frequency-diversity, reduced data throughput, reduced bandwidth availability, and reduced air-interface capacity.

The systems and methods provided herein can alleviate the problems discussed above. For instance, in aspects, the systems and methods disclosed herein improve coverage balancing and decrease interference from carriers or component carriers associated with the same base station, as well as carriers or component carriers associated with a neighboring base station. Additionally, the systems and methods disclosed herein provide for servicing UEs via a frequency-diversity effect that improves data throughput. For example, the systems and methods disclosed herein provide resources more efficiently to UEs via uplink and downlink communications by increasing availability of bandwidth through CA grouping based on UE location. As another example, the systems and methods disclosed herein provide improved air-interface capacity through CA grouping based on UE location.

Accordingly, in one aspect, a system for CA grouping based on a location of a user device is provided. The system comprises an antenna array comprising one or more antenna elements and one or more processors configured to execute operations. The operations comprise dividing a coverage area associated with a MIMO service into a first CA group and a second CA group. The operations additionally comprise determining the location of the user device. The operations also comprise receiving, from the user device, a SSB beam report associated with a beam. The beam is associated with a first component carrier. Further, the operations comprise assigning the first component carrier to the first CA group based on the location of the user device and the SSB beam report.

In another aspect, a method for CA grouping based on user device location is provided. The method comprises dividing a coverage area associated with a MIMO service into a plurality of CA groups. Additionally, the method receives, from a user device, an SSB beam report associated with a component carrier. Further, the method receives a location from the user device. Furthermore, the method assigns the component carrier to a first CA group of the plurality of CA groups based on the location of the user device and the SSB beam report. The UE is within a range of a serviceable area of the first CA group.

In yet another aspect, non-transitory computer-readable storage media having computer-executable instructions embodied thereon that, when executed by one or more processors, cause the one or more processors to perform operations. For example, the operations include dividing a coverage area associated with a MIMO service into CA groups for grouping different component carriers. Additionally, the operations include receiving, from a user device located within a serviceable area associated with the coverage area, an SSB beam report associated with a first component carrier. Further, the operations include determining a location of the user device. Based on the location of the user device and the SSB beam report, the operations further comprise assigning the first component carrier to a first CA group of the CA groups. A resource associated with the first CA group is then provided to the user device.

Turning now to FIG. 1, example CA grouping environment 100 comprises UEs 102 and 104, base station 114, CA group one 110, and CA group two 112. Example CA grouping environment 100 is but one example of a suitable CA grouping environment and is not intended to suggest any limitation as to the scope of use or functionality of the invention. Neither should the CA grouping environment be interpreted as having any dependency or requirement relating to any one or combination of components illustrated.

Beginning with UEs 102 and 104, the UEs may take on a variety of forms including: a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, a hotspot, and any combination of these delineated devices, or any other device (such as the computing device 600 in FIG. 6) that communicates via wireless communications to interact with a public or private network.

In aspects, UEs 102 and 104 may be configured to communication using 4G (e.g., LTE) or 5G. In some aspects, the UEs 102 and 104 comprise components to establish a 5G connection with a 5G gNB and to be served according to 5G over that connection. In some aspects, UEs 102 or 104 may be an E-UTRAN New Radio—Dual Connectivity (ENDC) device. ENDC allows a user device to connect to an LTE eNB that acts as a master node and a 5G gNodeB that acts as a secondary node. As such, in these aspects, the ENDC device may access both LTE and 5G simultaneously, and in some cases, on the same spectrum band.

In aspects, UEs 102 and 104 may have different capabilities for carrier aggregation. In some aspects, UE 102 is configured to perform CA with a first plurality of combinations of frequency ranges, whereas UE 104 is configured to perform CA with a second plurality of combinations of frequency ranges, wherein the second plurality of combinations comprises a different combination than the first plurality of combinations. In one aspect, a public land mobile network corresponding to UE 102 is associated with a license for a frequency range for a geographical area, whereas the public land mobile network corresponding to UE 104 is associated with a different license for a different frequency range for the geographical area.

As shown in FIG. 1, UEs 102 and 104 may communicate by way of transmission with base station 114 using one or more of 4G and 5G, sometimes simultaneously. Additionally, other wireless communication protocols may be utilized in conjunction with aspects described herein, as LTE and 5G are used for exemplary purposes only and not for limitation. In some aspects, the eNB or the gNB corresponding to base station 114 may comprise a macro base station, a small cell or femto base station, a relay, and so forth.

In some aspects, cell site 114 may include one or more band pass filters, radios, antenna arrays, power amplifiers, transmitters/receivers, digital signal processors, control electronics, GPS equipment, and the like. As discussed herein, cell site 114 is deployed in a network to control and facilitate, via one or more antenna arrays, the broadcast, transmission, synchronization, and receipt of one or more wireless signals in order to communicate with, verify, authenticate, and provide wireless communications service coverage to one or more UEs or other types of devices that request to join or are connected to the network.

In aspects, cell site 114 utilizes a massive MIMO antenna array comprising 128 antennas, for example. In some aspects, 64 of those antennas are configured as downlink antennas and the other 64 are configured as uplink antennas. For example, all of the antennas having positive polarization are configured as the downlink antennas for transmitting signals, whereas those having negative polarization are configured as the uplink antennas for receiving signals. Continuing the example, the cell site 114 may provide 16 layers of MIMO transmission (e.g., four transmit antennas for beamformed transmission associated with one layer). In some embodiments, massive MIMO service is provided by cell site 114 via a different sized massive MIMO antenna array or with other types of antenna structures.

The layers of the MIMO transmission (i.e., multiple different RF propagation paths) provided via the massive MIMO service may provide for engaging in coverage area communication concurrently on multiple different RF propagation paths. In aspects, the multiple layers occupy the same frequency resources (e.g., subcarriers and physical resource blocks). In some aspects, cell site 114 may weight and pre-code transmissions from particular antennas of the massive MIMO antenna array. Additionally, cell site 114 may transmit spatially separate, concurrent transmissions for UEs 102, 104, and other UEs to receive.

In some embodiments, cell site 114 comprises an antenna array, such as an active antenna array, FD-MIMO, massive MIMO, 3G, 4G, 5G, another generation communication system, and/or 802.11. In other aspects, the antenna array may comprise monopole, loop, parabolic, traveling-wave, aperture, yagi-uda, conical spiral, helical, conical, radomes, horn, and/or apertures, or any combination thereof. In some aspects wherein the base station 114 uses both 4G and 5G communication services, communication services eNB provides on one or more carriers that are different services than those the gNB provides on the one or more carriers. In some aspects, 4G services of the base station 114 support five component carriers and the 5G services of the base station 114 support sixteen contiguous and non-contiguous component carriers.

In an aspect, each of the one or more carriers may be an FDD or a TDD. In some aspects, each frequency channel corresponding to a carrier is characterized via a frequency bandwidth and a unique carrier identifier. In some aspects, a coverage area provided by the gNB may be divided into frames, sub-frames, symbol time segments, and timeslots over frequency into subcarriers to define air-interface resource elements. Continuing the example, depending on how the coverage area is divided, the air-interface resource elements may be divided into groups defining physical resource blocks. Further, the physical resource blocks may be used by the base station 114 for allocation of data to or from UEs 102 and 104.

As depicted by example CA grouping environment 100, cell site 114 may be configured to provide communication services to UEs 102, 104, and other UEs (not depicted) via one or more CA groups 110, 112, and other CA groups (not depicted). For example, base station 114 may divide a coverage area associated with a MIMO service (e.g., a massive MIMO service) into a first CA group 110 and a second CA group 112. For example, CA group 110 and CA group 112 may each comprise one or more carriers. In some aspects, CA group 110 and CA group 112 may each comprise one or more component carriers. In some aspects, CA group 110 and CA group 112 are adjacent cell areas having different CA groups.

In aspects, each carrier associated with CA group 110, for example, may be an FDD that defines separate frequency channels for downlink and uplink communication. As another example, each carrier associated with CA group 112 may be a TDD that defines a single frequency channel multiplexed over time between downlink and uplink. In some aspects, a carrier associated with both CA group 110 and CA group 112 may be an FDD and another carrier associated with both CA groups may be a TDD. In some aspects, a frequency channel of a carrier may occupy a frequency bandwidth that defines a range of frequency associated with a position in the RF spectrum.

In some aspects, the coverage area associated with the MIMO service provided by the gNB may be divided into frames, sub-frames, symbol time segments, and timeslots over frequency to form CA groups 110 and 112. For example, the coverage area may be divided over time into frames to form CA group 110 and CA group 112. In some aspects, the coverage area may be divided over time into frames, which are each divided into sub-frames or timeslots to form CA group 110 and CA group 112. Further, a carrier bandwidth of the coverage area could be divided over frequency into subcarriers to form CA group 110 and CA group 112. In some aspects, the subcarriers may be grouped within each timeslot of a frame to define physical resource blocks in which the subcarriers can be utilized to carry data.

Additionally, base station 114 or a component associated with base station 114 may receive, from UE 102 or 104, an SSB beam report in response to transmitting multiple SSB transmissions within a burst set. Continuing the example, the maximum number of transmissions with a carrier frequency range of up to 3 GHz is four. In some aspects, the maximum number of transmissions with a carrier frequency range of from 3-6 GHz is eight. In some aspects, the maximum number of transmissions with a carrier frequency range of from 6-52.6 GHz is sixty-four. In some aspects, base station 114 does not transmit the maximum number of transmissions available for the burst set. In some aspects, base station 114 transmits a message comprising the number of SSB transmissions transmitted. For example, the message may be transmitted by a preamble, a common control channel, a downlink grant, and so forth.

In aspects, UEs 102 and 104 are configured to receive the SSB transmission and the message comprising the number of SSB transmissions via antennas and wireless radios. In some aspects, UEs 102 and 104 store data associated with the SSB transmission received in memory. For example, UEs 102 and 104 may be configured to receive transmission configuration indication information or quasi co-location information indicating an SSB of the burst set associated with a downlink beam or an uplink beam. In aspects, UEs 102 and 104 are configured to receive timing advance parameters or power control parameters for the downlink beam.

In response to receiving the SSB transmissions, UEs 102 and 104 may transmit the SSB beam report to the base station 114. The SSB beam report may provide information to base station 114 associated with one or more of the SSB transmissions within the burst set. In aspects, the information in the SSB beam report may be associated with a beam corresponding to a carrier. In aspects, SSB beam report includes channel state information corresponding to one or more of the multiple SSB transmissions. For example, the channel state information may include an RSRP measurement (e.g., an SS-RSRP measurement or a CSI-RSRP measurement). In aspects, the SSB beam report may include one or more of the following: SS-RSRP measurements, CSI-RSRP measurements, NR-RSSI measurements (e.g., accounting for adjacent channel interference and thermal noise), CSI-RSSI measurements corresponding to OFDM symbols, SS-RSRQ measurements, CSI-RSRQ measurements, and SS-SINR measurements.

In aspects, the SSB beam report may indicate that a beam corresponding to the multiple SSB transmissions has a strongest transmitting signal among a plurality of beams. In some aspects, the UEs 102 and 104 determine the strongest transmitting signal among the plurality of beams by jointly considering the plurality of beams. Continuing the example, in some aspects, the plurality of beams are jointly considered by beam sweeping one beam and assuming beam sweeping for the other beams (e.g., when the UE is quickly moving and does not have sufficient time to perform beam sweeping for all of the other beams). In some aspects, the strongest transmitting signal is determined based on decoding a PDSCH or PDCCH quasi co-located with a particular beam. In some aspects, the strongest transmitting signal indicated by the SSB beam report from UE 102 is associated with a different beam than the beam indicated by the SSB beam report from UE 104. In some aspects, UE 102 considered a plurality of beams having at least one different beam than the plurality of beams considered by UE 104. In some aspects, each beam of the plurality of beams considered by UE 102 is associated with a different carrier.

Furthermore, base station 114 determines a location of the UEs 102 and 104. In aspects, the location is determined in response to receiving the SSB beam report. In some aspects, the location is associated with the location of the respective UE upon transmission of the SSB beam report to the base station 114. In some aspects, the location is determined based on location information transmitted by the corresponding UE to base station 114. For example, the location information may comprise latitude, longitude, altitude, GPS coordinates, a distance between an antenna associated with the base station 114 and the UE, or a measured time difference between reference signals transmitted by base station 114. In some aspects, the location information includes a set of coordinates relative to a known location defined by geographic or civic (e.g., a postal address) terms.

In some aspects, the base station 114 may determine the location of the corresponding UE by using a 5G network (e.g., NG Radio Access Networking and a 5G Core Network) and OTDOA positioning. In some aspects, the location is determined using a Global Navigation Satellite System satellite vehicle. In some aspects, the location is determined using position reference signals transmitted by the base station 114. In some aspects, the location is determined based on a combination of one or more of GPS coordinates, propagation times, signal strengths, directional information associated with a beam, and so forth. In some aspects, triangulation techniques (e.g., using two or more gNBs) may be used to determine the location.

In some aspects, the location is determined by a server based on UE reported location measurements. For example, the server may store coverage information via a location server database, the information comprising antenna location information, radio beam direction information, antenna pattern information, and bound geographic area information associated with a cell or radio beam. In some aspects, the server determines the location based on received location measurements from the base station 114 or the UE, the location measurements comprising RSSI, RTT, RSRP, RSRQ, AOA, or TOA for signals transmitted by the UE.

Furthermore, in example CA grouping environment 100, base station 114 assigns a first carrier or component carrier to the first CA group 110 based on the location of the UE 102 and the SSB beam report transmitted to the base station 114 by UE 102. In some embodiments, base station 114 assigns a second carrier or component carrier to the second CA group 112 based on the location of the UE 104 and the SSB beam report transmitted to the base station 114 by UE 104. The first CA group 110 allocates resources to the UE 102 and the second CA group 112 allocates resources to the UE 104. For example, resources may include an uplink or downlink air-interface resource. In some aspects, the resources are associated with a connection change with an access node of base station 114.

Figure 2:
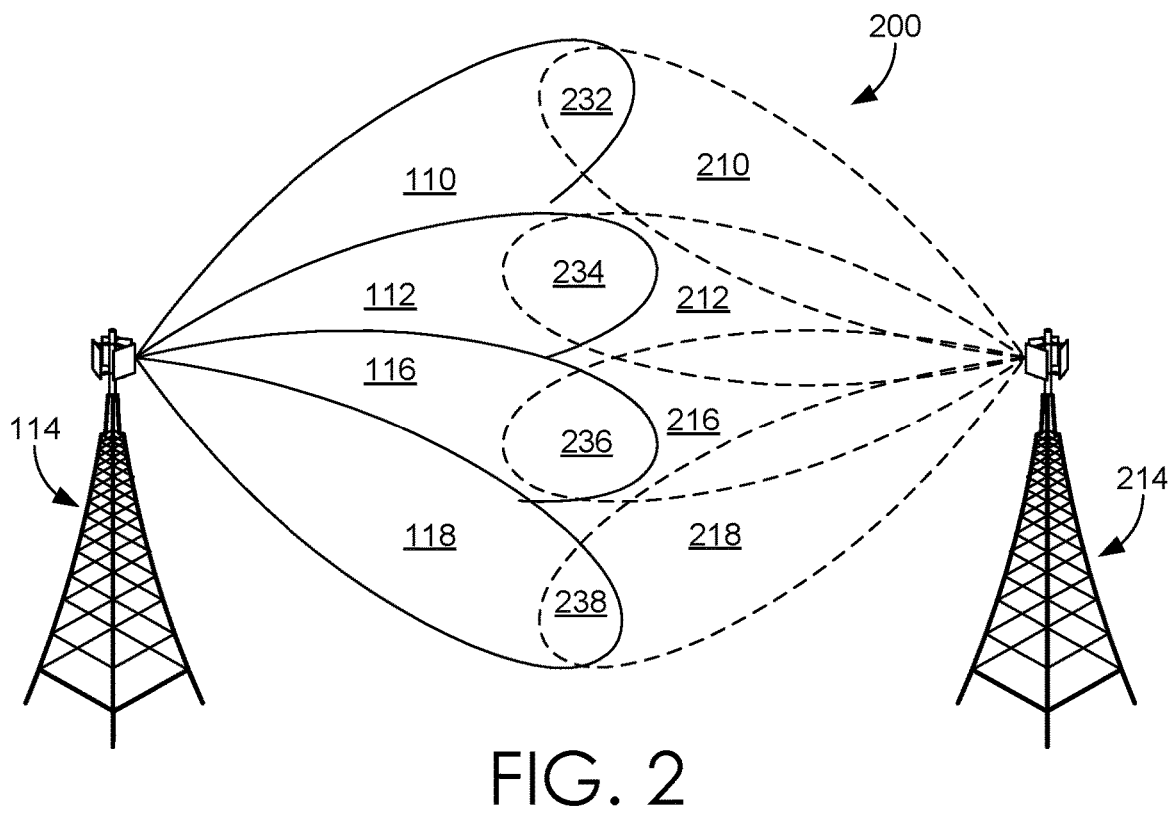
FIG. 2 illustrates a diagram of an example CA grouping environment with a neighboring base station, in accordance with aspects herein.

Turning now to FIG. 2, example CA grouping environment 200 comprises CA group 110, CA group 112, CA group 116, and CA group 118 associated with base station 114. Further, example CA grouping environment 200 comprises CA group 210, CA group 212, CA group 216, and CA group 218 associated with base station 214. Furthermore, example environment 200 comprises interference 232, interference 234, interference 236, and interference 238.

In aspects, base station 114 may divide a coverage area associated with a MIMO service (e.g., a massive MIMO service) into CA group 110, CA group 112, CA group 116, and CA group 118. In aspects, base station 214 may divide a coverage area associated with a MIMO service (e.g., a massive MIMO service) into CA group 210, CA group 212, CA group 216, and CA group 218. In aspects, base stations 114 and 214 may divide their respective coverage areas into the CA groups depicted based on antenna arrays, signal range, and geographic area. In some aspects, each CA group is associated with an identifier for distinguishing neighboring CA groups (e.g., neighboring CA groups 116 and 216). For example, the identifier may include a physical cell identifier or a virtual cell identifier. In embodiments, due to interference 232 associated with overlapping coverage area from neighboring CA groups 110 and 210, CA group 110 is grouped differently than CA group 210 to reduce interference 232 between base station 114 and the UEs it services, as well as to reduce interference 232 between base station 214 and the UEs it services.

For example, base station 114 may receive location information from a UE within a coverage area of base station 114. Additionally, base station 114 may receive an SSB beam report from the UE, the SSB beam report comprising CSI. Similarly, base station 214 may receive location information from a second UE within a coverage area of base station 214 as well as a second SSB beam report from the second UE. Based on the location of the UE and the SSB beam report, base station 114 may assign a component carrier to CA group 110 for the allocation of resources to the UE. Further, based on the location of the second UE and the second SSB beam report, base station 214 may assign a different component carrier to CA group 210 for the allocation of resources to the second UE.

In some aspects, assigning a component carrier is additionally based on whether interference 232, interference 234, interference 236, or interference 238 is above a threshold. In some aspects, CA group 216 and CA group 218 are supported by a same carrier. In some aspects, the component carrier assigned to the corresponding CA group is a primary component carrier or a secondary component carrier. For example, base station 214 may activate both a primary component carrier and a secondary component carrier associated with a particular one of the CA groups for allocating resources to one or more UEs being serviced by the particular one of the CA groups.

Figure 3:
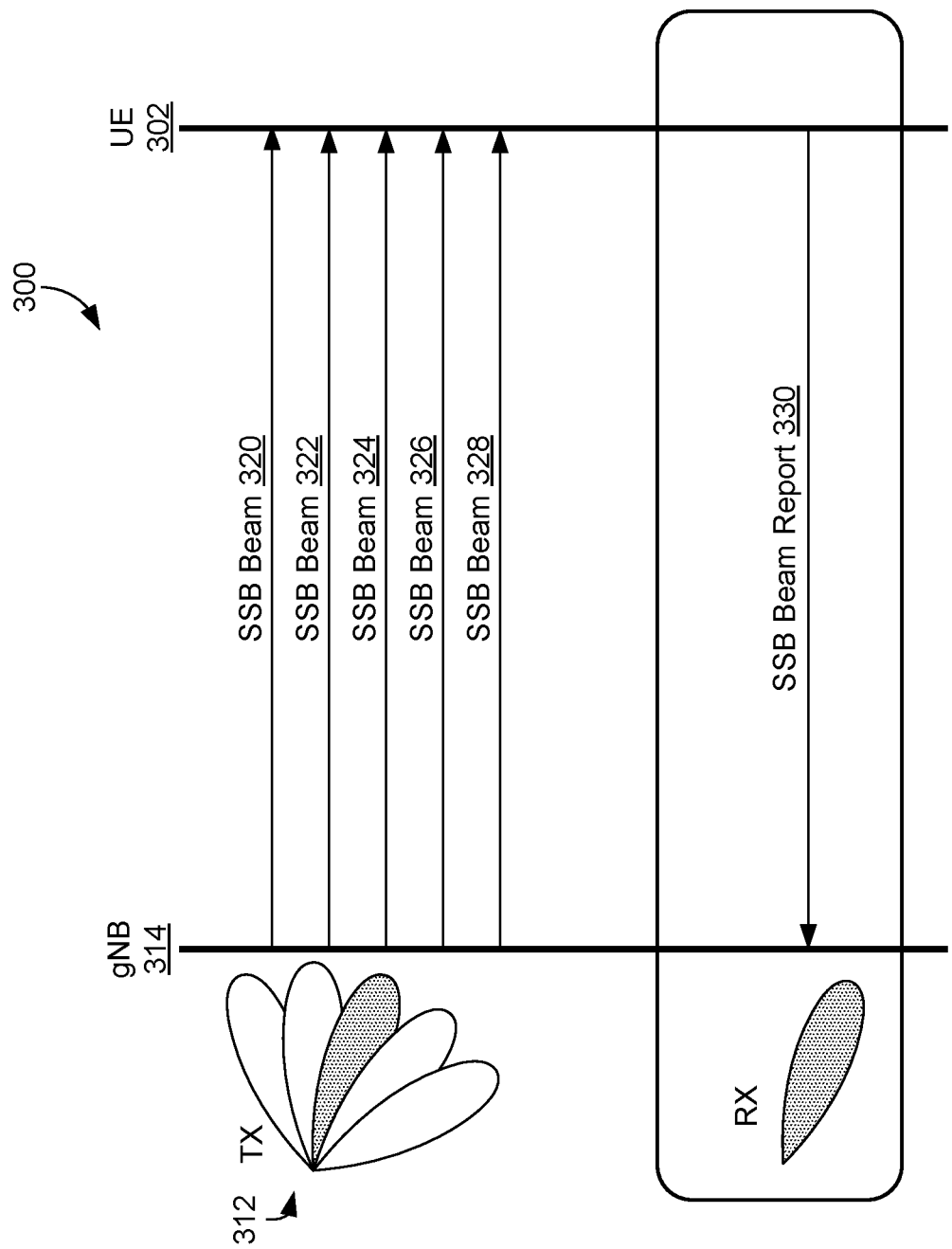
FIG. 3 depicts a diagram of an example Synchronization Signal Block beam reporting environment, in accordance with aspects herein.

Turning now to FIG. 3, example SSB beam reporting environment 300 comprises a burst set 312 of SSB beams transmitted by gNB 314. In example environment 300, the burst set 312 comprises SSB beam 320, SSB beam 322, SSB beam 324, SSB beam 326, and SSB beam 328. In this example, UE 302 receives the transmitted SSB beams 320-328 and upon receipt of the SSB beams 320-328, UE 302 performs ongoing SSB measurements. Further, UE 302 provides an SSB beam report 330 to gNB 314.

In some aspects, the burst set 312 comprises multiple and repeated SSB beam transmissions within a particular time frame. In aspects, UE 302 measures the discovery reference signal of the time frame. For example, the discovery reference signal may comprise synchronization signals, a cell specific reference signal, a master information block signal, and other cell identification signals. In some aspects, the number of SSB beam transmissions is based on subcarrier spacing or frequency band. For example, if the frequency band is below 3 GHz, gNB 314 may transmit up to four SSB beams within a five-millisecond time frame. As another example, if the frequency band is above 6 GHz, gNB 314 may transmit up to sixty-four SSB beams within a five-millisecond time frame.

In aspects, gNB 314 uses optimized OFDM waveforms with scalable numerology having a flexible framework for multiplex services and features with advanced wireless technologies, such as massive MIMO, millimeter wave transmissions, advanced channel coding, and device-centric mobility, for example. The scalable numerology may provide for scaling of subcarrier spacing, such as an outdoor and macro coverage deployment of less than 3 GHz FDD/TDD implementations with subcarrier spacing with 15 kHz having bandwidth of 1, 5, 10, 20 MHz, for example. As another example, an outdoor and small cell coverage deployment of TDD greater than 3 GHz may comprise subcarrier spacing with 30 kHz over 80/100 MHz bandwidth.

In aspects, UE 302 performs the SSB measurements on the SSB beams 320-328 to provide the SSB beam report 330 to gNB 314. In aspects, the SSB beam measurements are used to determine which of the SSB beams 320-328 has the strongest transmitting signal detected by the UE 302. For example, UE 302 may determine, by mapping the SSB beams 320-328 to random access resources, that SSB beam 324 has the strongest transmitting signal. In some aspects, UE 302 also receives, from gNB 314, control information for the UE 302 to use for decoding. In some aspects, the decoding is based on a random access radio network temporary identifier.

In addition to the receipt of SSB beam report 330, gNB 314 may also receive or determine a location of UE 302. For example, gNB 314 may receive or determine the location before, after, or during receipt of the SSB beam report 330. In aspects, the location is associated with the location of the UE at the time of transmission of the SSB beam report 330 to gNB 314. In some aspects, the location is associated with the location of the UE at a time prior to the transmission of the SSB beam report 330, wherein the time prior to the transmission is within a range of time below a threshold. In some aspects, the location is associated with the location of the UE at a time after the transmission of the SSB beam report 330, wherein the time after the transmission is within a range of time below a threshold. In some aspects, the location is determined from location information received from UE 302. In some aspects, a location server determines the location of UE 302.

Based on the SSB beam report 330 and the location of the UE 302, gNB 314 assigns SSB beam 324 to a first CA group for the allocation of resources to the UE 302 by the first CA group. In some aspects, a first component carrier or a first carrier that is associated with SSB beam 324 is assigned to the first CA group provides downlink resources to UE 302. In some aspects, the first component carrier or the first carrier assigned to the first CA group provides uplink resources to UE 302. In some aspects, the first component carrier or the first carrier assigned to the first CA group provides both uplink and downlink resources to UE 302.

Figure 4:
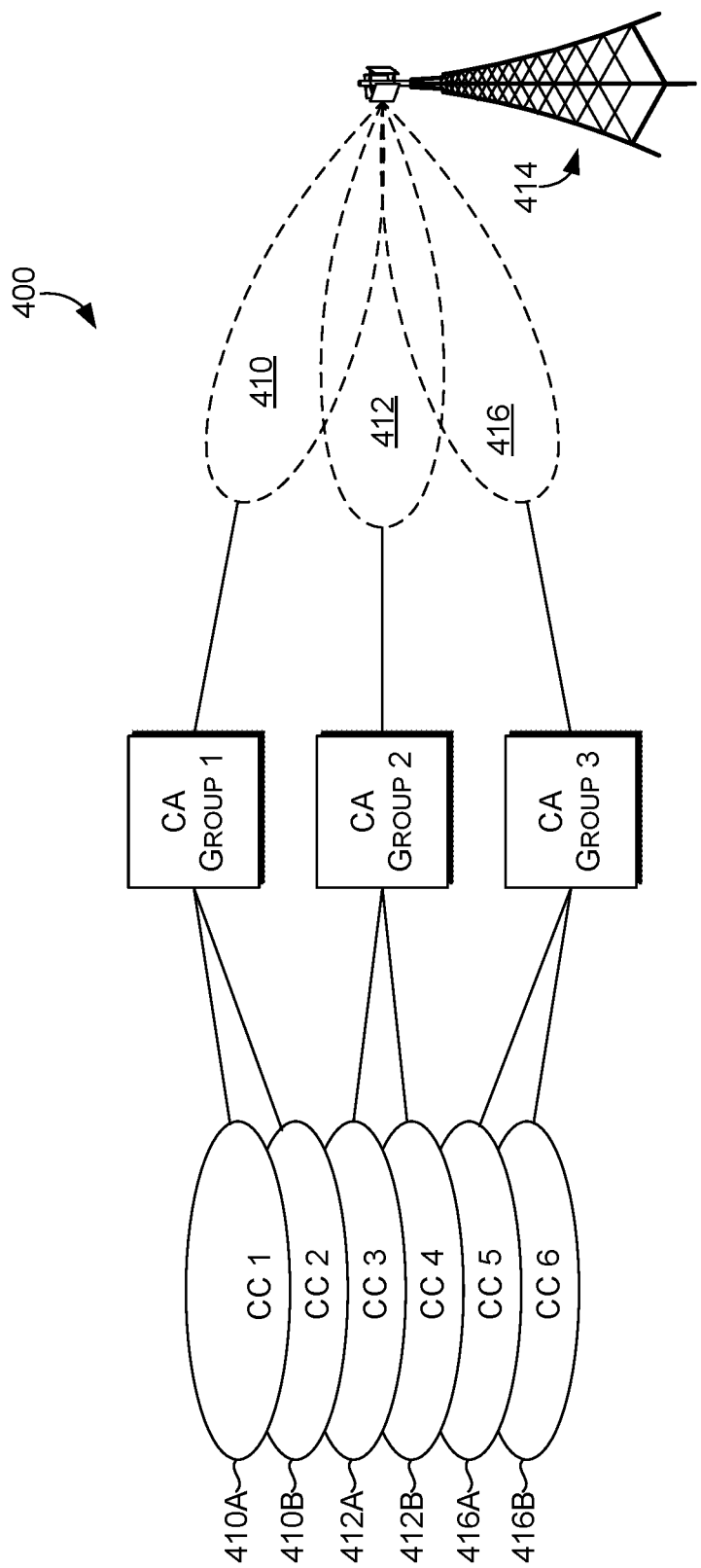
FIG. 4 depicts a diagram of an example CA grouping environment, in accordance with aspects herein.

Turning to FIG. 4, example CA grouping environment 400 comprises gNB 414 that provides a set of three CA groups 410, 412, and 416 that each provide a coverage area; component carriers 410A and 410B assigned to first CA group 410; component carriers 412A and 412B assigned to second CA group 412; and component carriers 416A and 416B assigned to third CA group 416. In an aspect, gNB 414 assigns component carriers 410A and 410B to first CA group 410 based on a location of a first UE and a first SSB beam report received by the first UE. In an aspect, gNB 414 assigns component carrier 410A to the first CA group 410 based on a location of the first UE and the first SSB beam report received by the first UE, and gNB 414 additionally assigns component carrier 410B to first CA group 410 based on another location of the first UE and another SSB beam report received by the first UE received at a different time than the receipt of the first SSB beam report. In some aspects, gNB 414 additionally assigns component carrier 410B to first CA group 410 based on an SSB beam report received by a different UE and based on the location of the different UE.

In an aspect, gNB 414 assigns component carriers 412A and 412B to second CA group 412 based on a location of a second UE and a second SSB beam report received by the second UE. In an aspect, gNB 414 assigns component carriers 416A and 416B to third CA group 416 based on a location of a third UE and a third SSB beam report received by the third UE. In an aspect, gNB 414 assigns component carrier 416A to the third CA group 416 based on a location of the third UE and the third SSB beam report received by the third UE, and gNB 414 additionally assigns component carrier 416B to third CA group 416 based on a location of a fourth UE and a fourth SSB beam report received by the fourth UE. In an aspect, component carrier 410A has a same carrier as component carrier 416A.

Turning now to FIG. 5, a flow diagram of an example method 500 for CA grouping based on user device location is depicted. At 510, a coverage area associated with a MIMO service is divided into CA groups. For example, each CA group may comprise at least one carrier or component carrier. In some aspects, adjacent CA groups and neighboring CA groups comprise different carriers. In some aspects, CA grouping is based on frames, sub-frames, symbol time segments, or timeslots over frequency.

At 520, an SSB beam report and UE location information is received from a UE. The SSB beam report may be associated with one or more beams of a burst set. In some aspects, each of the one or more beams is associated with a component carrier. Additionally, the SSB beam report may comprise channel state information (e.g., RSRP measurements) associated with the beam and component carrier. In some aspects, the SSB beam report indicates that one of the beams from the burst set has a strongest transmitting signal. In some aspects, the SSB beam report indicates that a beam is experiencing interference associated with a neighboring component carrier or a neighboring CA group based on an interference measurement.

In some aspects, the UE location information received from the UE is used to determine a location of the UE at the time of the UE transmitting the SSB beam report. In some aspects, the location information corresponds to a location at a time before transmitting the SSB beam report. In some aspects, the location of the UE is based on GPS coordinates received from the UE. In some aspects, the location of the UE is based on trilateration or multilateration via base station signal delay measurements reported by the UE. In some aspects, a second SSB beam report is received from the UE based on a change of a location of the UE.

In some aspects, a second location of a second UE is determined based on GPS coordinates received by the second UE. In some aspects, a distance between the UE and the second UE is determined. Continuing the example, the distance may be above a threshold distance. Additionally, a second SSB beam report may be received from the second UE. The second SSB beam report may indicate that a second beam from the burst set has a strongest transmitting signal, wherein the second beam is a different beam than the beam indicated by the SSB beam report from the other UE as having a strongest transmitting signal. In some aspects, the second SSB beam report indicates that a beam is experiencing interference associated with a neighboring component carrier or a neighboring CA group based on an interference measurement.

At 530, at least one carrier or component carrier is assigned to at least one of the CA groups based on a location of the UE and the SSB beam report. In some aspects, a different carrier is assigned to a second CA group based on the second SSB beam report and the second location of the second UE. For example, the carrier assigned to the CA group may be assigned to that CA group further based on the associated beam having the strongest transmitting signal. Continuing the example, the different carrier assigned to the second CA group may be assigned to the second CA group further based on the second beam having the strongest transmitting signal as indicated by the second SSB beam report. Additionally, the different carrier may be assigned to the second CA group further based on the distance between the UE and the second UE being above the threshold distance. In some aspects, a second component carrier is assigned to the second CA group based on the interference measurement indicated in the second SSB beam report, the second CA group being a different CA group than the neighboring CA group causing the interference.

In aspects, the CA group allocates resources to the UE and the second CA group allocates resources to the second UE. For example, the CA group may allocate a downlink air-interface resource for the transmission of data to the UE and the second CA group may allocate a downlink air-resource to the second UE. In some aspects, the CA group may allocate an uplink air-interface resource to the UE and the second CA group may allocate an uplink air-resource to the second UE. In some aspects, one component carrier provides a downlink resource to the UE and another component carrier provides an uplink resource to the UE, wherein both carriers are assigned to the CA group.

In some aspects, a new location of the UE is received by the UE. Based on the new location, the UE may transmit another SSB beam report in response to the changed location. Continuing the example, the other SSB beam report may indicate that another component carrier is now transmitting a stronger signal than the strongest transmission signal indicated in the previous SSB beam report. Based on the new location of the UE and stronger signal, the other component carrier may be assigned to another CA group for the allocation of resources to the UE. In some aspects, the other component carrier then provides downlink resources to the UE and a third component carrier of the another CA group provides uplink air-interface resources to the UE.

In some aspects, a first CA group provides resources to the UE. Continuing the example, a second user device at a second location transmits a second SSB beam report associated with a second component carrier, the second SSB beam report indicating that the second component carrier has the strongest transmitting signal among the different component carriers. Further, a third SSB beam report is received from a third user device at a third location, the third SSB beam report associated with a third component carrier. Further, the third SSB beam report may indicate that the third component carrier has the strongest transmitting signal among the different component carriers. Furthermore, based on the second location and the second SSB beam report, the second component carrier may be assigned to a second CA group. Additionally, based on the third location and the third SSB beam report, the third component carrier may be assigned to a third CA group. Thereafter, a second resource associated with the second CA group may be provided to the second user device. Additionally, a third resource associated with the third CA group may be provided to the third user device.

Turning now to FIG. 6, a diagram is depicted of an exemplary computing environment suitable for use in implementations of the present disclosure. In particular, the exemplary computer environment is shown and designated generally as UE/user device 600. User device 600 is but one example of a suitable computing environment and is not intended to suggest any limitation as to the scope of use or functionality of the invention. Neither should user device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, user device 600 includes bus 602 that directly or indirectly couples the following devices: memory 604, one or more processors 606, one or more presentation components 608, input/output (I/O) port(s) 610, I/O component(s) 612, power supply 614, and radio(s) 616. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O component(s) 612. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "user device."

User device 600 typically includes a variety of computer-readable media. Computer-readable media can be any available media that can be accessed by user device 600. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Further, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Turning to memory 604, memory 604 includes computer-storage media in the form of volatile and/or nonvolatile memory. Memory 604 may be removable, nonremovable, or a combination thereof. Examples of memory 604 include solid-state memory, hard drives, optical-disc drives, etc. For instance, memory 604 may include RAM, ROM, Dynamic RAM, a Synchronous Dynamic RAM, a flash memory, a cache memory, a buffer, a short-term memory unit, a long-term memory unit, or other suitable memory units. Removable memory may include, for example, a hard disk drive, a floppy disk drive, a Compact Disk drive, a CD-ROM drive, a DVD drive, or other suitable removable units.

Turning to the one or more processors 606, the one or more processors 606 read data from various entities such as bus 602, memory 604 or I/O component(s) 612. The one or more processors 606 include, for example, a Central Processing Unit, a Digital Signal Processor, one or more processor cores, a single-core processor, a dual-core processor, a multiple-core processor, a microprocessor, a host processor, a controller, a plurality of processors or controllers, a chip, a microchip, one or more circuits, circuitry, a logic unit, an IC, an ASIC, or any other suitable multi-purpose or specific processor or controller. Further, the one or more processors 606 execute instructions, for example, of an Operating System of the user device 600 and/or of one or more suitable applications.

Further, the one or more presentation components 608 present data indications to a person or other device. Examples of one or more presentation components 608 include a display device, speaker, printing component, vibrating component, etc. Additionally, I/O port(s) 610 allow user device 600 to be logically coupled to other devices including I/O component(s) 612, some of which may be built in user device 600. Illustrative I/O component(s) 612 include a microphone, joystick, game pad, satellite dish, scanner, printer, wireless device, etc. Furthermore, power supply 614 may include any suitable source of power, such as a rechargeable lithium polymer battery and/or an alternating current power converter.

Turning to radio 616, the radio 616 facilitates communication with a wireless telecommunications network. For example, radio 616 may facilitate communication via wireless communication signals, RF signals, frames, blocks, transmission streams, packets, messages, data items, and/or data. The terms "radio," "controller," "antenna," and "antenna array" are used interchangeably to refer to one or more software and hardware components that facilitate sending and receiving wireless radio-frequency signals, for example, based on instructions from a cell site. Radio 616 may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via mmWaves, FD-MIMO, massive MIMO, 3G, 4G, 5G, and/or 802.11 protocols and techniques, etc.

Illustrative wireless telecommunications technologies that radio 616 may facilitate include CDMA, GPRS, TDMA, GSM, and the like. Radio 616 might additionally or alternatively facilitate other types of wireless communications including Wi-Fi, WiMAX, LTE, or other VoIP communications. As can be appreciated, in various embodiments, radio 616 can be configured to support multiple technologies and/or multiple radios can be utilized to support multiple technologies.

The invention claimed is:

1. A system for carrier aggregation (CA) grouping based on a location of a user device, the system comprising:
   a first base station having an antenna array comprising one or more antenna elements;
   a second base station; and
   one or more processors configured to execute operations corresponding to the first base station, the operations comprising:
   dividing a coverage area associated with a multiple-input multiple-output (MIMO) service into a first CA group having a cell area of the coverage area for allocating a resource to the user device within the cell area, the first CA group being a different CA group than a neighboring CA group of a plurality of component carriers provided by the second base station, the neighboring CA group having an overlapping coverage area with the cell area of the first CA group;

determining the location of the user device;
receiving, from the user device, a Synchronization Signal Block (SSB) beam report associated with a beam, wherein the beam is associated with a first component carrier; and
based on the location of the user device and the SSB beam report, assigning the beam associated with the first component carrier to the first CA group such that the first CA group comprises a plurality of component carriers including the first component carrier for allocating the resource to the user device within the cell area.

2. The system according to claim 1, wherein the SSB beam report comprises channel state information of the beam associated with the first component carrier, the channel state information including a Reference Signal Received Power measurement.

3. The system according to claim 1, further comprising:
determining a second location of a second user device based on GPS coordinates received from the second user device;
determining the second location of the second user device is above a threshold distance from the location of the user device;
receiving a second SSB beam report from the second user device, the second SSB beam report associated with a second component carrier; and
based on the second location being above the threshold distance and the second SSB beam report, assigning the second component carrier to a second CA group having a second cell area of the coverage area.

4. The system according to claim 1, wherein the MIMO service is a massive MIMO service.

5. The system according to claim 1, wherein the SSB beam report indicates that the beam has a strongest transmitting signal among a plurality of beams, wherein each beam of the plurality of beams is associated with a component carrier different than the first component carrier.

6. The system according to claim 1, further comprising:
allocating, to the user device, a downlink air-interface resource associated with the first CA group for transmitting data to the user device.

7. The system according to claim 1, further comprising:
allocating, to the user device, an uplink air-interface resource associated with the first CA group.

8. The system according to claim 1, wherein the first base station providing the MIMO service is configured for dual connectivity of LTE and 5G NR.

9. A method for carrier aggregation (CA) grouping based on user device location, the method comprising:
dividing a coverage area of a first base station associated with a multiple-input multiple-output (MIMO) service into a plurality of CA groups for assigning a plurality of component carriers to each of the plurality of CA groups, wherein a first CA group of the plurality of CA groups is a different CA group than a first neighboring CA group of component carriers provided by a second base station;
receiving, from a user device, a Synchronization Signal Block (SSB) beam report associated with a component carrier;
receiving a location from the user device; and
based on the location of the user device and the SSB beam report, assigning the component carrier to the first CA group of the plurality of CA groups, such that the first CA group comprises a first plurality of component carriers including the component carrier.

10. The method according to claim 9, further comprising:
allocating, to the user device, a downlink air-interface resource associated with the component carrier of the first CA group for transmitting data to the user device.

11. The method according to claim 9, further comprising:
receiving a second location of a second user device;
receiving a second SSB beam report from the second user device, the second SSB beam report associated with a second component carrier;
detecting an interference with the second component carrier from the first neighboring CA group provided by the second base station; and
based on the second location, the second SSB beam report, and the interference, assigning the second component carrier to a second CA group of the plurality of CA groups, wherein the second CA group comprises a second plurality of component carriers including the second component carrier.

12. The method according to claim 11, further comprising:
allocating resources to the second user device from the second CA group; and
receiving data from the second user device via an allocated uplink air-interface resource associated with the second CA group.

13. The method according to claim 9, wherein the MIMO service is a massive MIMO service, and wherein the SSB beam report comprises SS-RSRQ measurements, CSI-RSRQ measurements, and SS-SINR measurements.

14. The method according to claim 9, wherein the SSB beam report indicates that the component carrier has a strongest transmitting signal relative to transmitting signals from other component carriers.

15. Non-transitory computer-readable storage media having computer-executable instructions embodied thereon that, when executed by one or more processors, cause the one or more processors to perform operations for carrier aggregation (CA) grouping based on user device location, the operations comprising:
dividing a coverage area of a first base station associated with a multiple-input multiple-output (MIMO) service into CA groups for grouping different component carriers, wherein a first CA group of the CA groups is a different CA group than a first neighboring CA group of component carriers provided by a second base station;
receiving, from a user device located within a serviceable area associated with the coverage area, a Synchronization Signal Block (SSB) beam report associated with a first component carrier;
determining a location of the user device;
based on the location of the user device and the SSB beam report, assigning the first component carrier to the first CA group of the CA groups, the first CA group comprising a plurality of component carriers including the first component carrier; and
providing a resource associated with the first CA group including the first component carrier to the user device.

16. The media of claim 15, further comprising:
detecting, from the SSB beam report, an interference measurement associated with the first neighboring CA group provided by the second base station, wherein the interference measurement is above a threshold; and
assigning the first component carrier to the first CA group based on the interference measurement being above the threshold.

17. The media of claim 15, wherein the resource provided to the user device comprises a downlink air-interface resource associated with a second component carrier of the plurality of component carriers of the first CA group.

18. The media of claim 15, further comprising:
receiving, from the user device, a second SSB beam report in response to a change in the location of the user device, wherein the second SSB beam report indicates that a second component carrier has a stronger transmitting signal than the first component carrier;
receiving a new location of the user device from the user device;
based on the new location and the stronger transmitting signal, assigning the second component carrier to a second CA group of the CA groups; and
providing a second resource associated with the second CA group to the user device.

19. The media of claim 18, wherein the second resource provided to the user device comprises an uplink air-interface resource associated with a third component carrier assigned to the second CA group.

20. The media of claim 15, wherein the SSB beam report indicates that the first component carrier has a strongest transmitting signal among the different component carriers, and wherein the operations further comprise:
receiving, from a second user device at a second location, a second SSB beam report associated with a second component carrier, the second SSB beam report indicating that the second component carrier has the strongest transmitting signal among the different component carriers;
receiving, from a third user device at a third location, a third SSB beam report associated with a third component carrier, the third SSB beam report indicating that the third component carrier has the strongest transmitting signal among the different component carriers;
based on the second location and the second SSB beam report, assigning the second component carrier to a second CA group;
based on the third location and the third SSB beam report, assigning the third component carrier to a third CA group;
providing a second resource associated with the second CA group to the second user device; and
providing a third resource associated with the third CA group to the third user device.

\* \* \* \* \*